(12) United States Patent
Wu

(10) Patent No.: US 6,278,092 B1
(45) Date of Patent: Aug. 21, 2001

(54) LAGGING DEVICE

(76) Inventor: Chia-Hsiung Wu, P.O. Box No. 6-57, Chung-Ho City, Taipei Hsien 235 (TW)

( * ) Notice: Subject to any disclaimer, the term of this patent is extended or adjusted under 35 U.S.C. 154(b) by 0 days.

(21) Appl. No.: 09/474,260

(22) Filed: Dec. 29, 1999

(51) Int. Cl.[7] ....................................... H05B 3/34
(52) U.S. Cl. ........................ 219/549; 219/212; 219/528; 219/529
(58) Field of Search .................... 219/538, 539, 219/541, 542, 543, 546, 548, 549, 520, 528, 212, 217; 338/22 R, 204, 205, 307–308

(56) References Cited

U.S. PATENT DOCUMENTS

| | | | |
|---|---|---|---|
| 4,072,848 | * 2/1978 | Johnson et al. ...................... | 219/528 |
| 5,197,329 | * 3/1993 | Grundy ................................ | 338/308 |
| 5,663,702 | * 9/1997 | Shaw, Jr. et al. ................... | 338/22 R |
| 5,804,797 | * 9/1998 | Kaimoto et al. ..................... | 219/505 |
| 5,824,996 | * 10/1998 | Kochman et al. ................... | 219/529 |

* cited by examiner

Primary Examiner—Tu Ba Hoang
(74) Attorney, Agent, or Firm—Dougherty & Troxell

(57) ABSTRACT

A lagging device, comprises a flexible and insulating pad; anode plate and cathode plate arranged in parallel on the top surface of the pad; a plurality of PTC ceramic resistor arranged cross the anode plate and the cathode plate. Each resistor has anode and cathode in contact with the anode plate and the cathode plate, respectively. The lagging device further has an isolation layer covering at least the topside of the pad. The inventive lagging device can be easily applied to curve surface.

8 Claims, 4 Drawing Sheets

LAGGING DEVICE

BACKGROUND OF THE INVENTION

1) Field of the Invention

The present invention relates to a lagging device, especially to a lagging device which can be applied to the surface of a current object.

2) Description of the Prior Art

As the advance of technology, the warn-keeping or lagging of object is performed by electric heater or electric wrap other than by fire. The conventional electric wraps are used to keep user warm at clod weather or condition. However, they are bulky in application. The electric wrap generally comprises of a plug connected to AC power source and coil for generating heat. The user can put the portion with thermal coil to the location required to keep warm. However, the conventional electric wrap has following problems:

1. The heating coil is liable to oxidation and break and hard to repair due to the arrangement thereof being within the wrap.
2. The heating coil is generally controlled by a thermal sensor to keep constant power. However, the thermal sensor in different environment may have different response, even malfunction.
3. The heating coil may generate dangerous spark.

SUMMARY OF THE INVENTION

It is an object of the present invention to provide a lagging device which comprises a flexible and insulating substrate, flexible circuit plate on the substrate, a plurality of PTC ceramic resistors arranged alternatively on the flexible circuit plate, whereby the lagging device can be attached to a curve object.

It is still another object of the present invention to provide a lagging device the PTC resistor thereof can be attached directly to the portion to be kept warm.

It is still another object of the present invention to provide a lagging device which has isolation layer curving the PTC resistor thereof.

It is still another object of the present invention to provide a lagging device which has compact structure and can be easily attached to a curve portion.

It is still another object of the present invention to provide a lagging device which has not the problem of open circuit and external voltage failure when being applied to a curve surface.

It is still another object of the invention to provide a lagging device which is applicable to AC or DC power source.

The various objects and advantages of the present invention will be more readily understood from the following detailed description when read in conjunction with the appended drawing, in which:

DETAILED DESCRIPTION OF THE PREFERRED EMBODIMENTS

Figure 1:
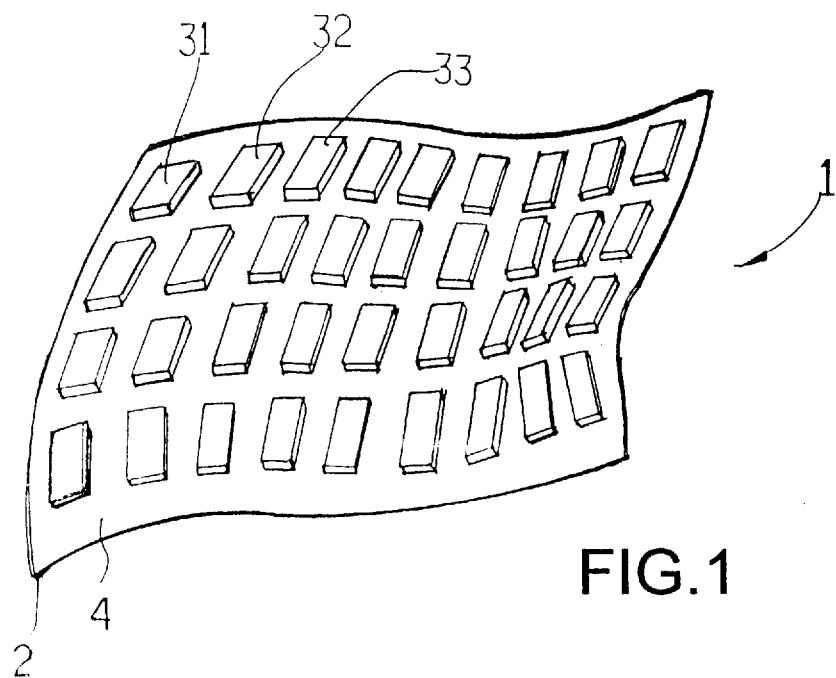
FIG. 1 is the perspective view of the present invention.

As shown in FIG. 1, the invention lagging device 1 comprises a flexible insulating pad 2, a plurality PTC ceramic resistors 31, 32, 33 and an isolation layer 4. Moreover, the pad 2 has a plug (not shown) for connecting to a socket.

Figure 2:
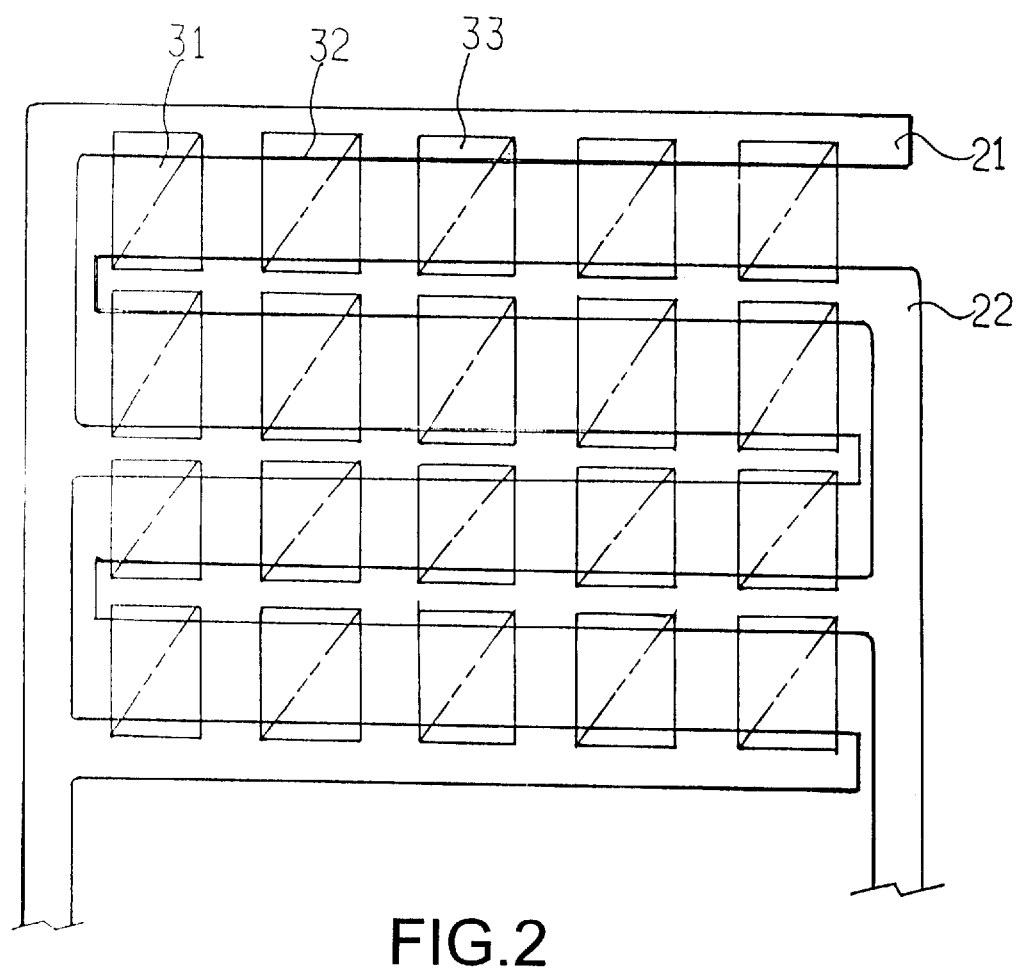
FIG. 2 is the schematic diagram of the flexible circuit.

As shown in FIG. 2, a flexible anode 21 and a flexible cathode 22 are formed on the top surface of the pad 2. The anode 21 and the cathode 22 are made of conductive film or flexible metal plate such that they are still conductive when being bent. Moreover, the anode 21 and the cathode 22 are arranged in parallel, and the plurality of PTC ceramic resistors 31, 32, 33 are arranged upon the anode and cathode.

Figure 3:
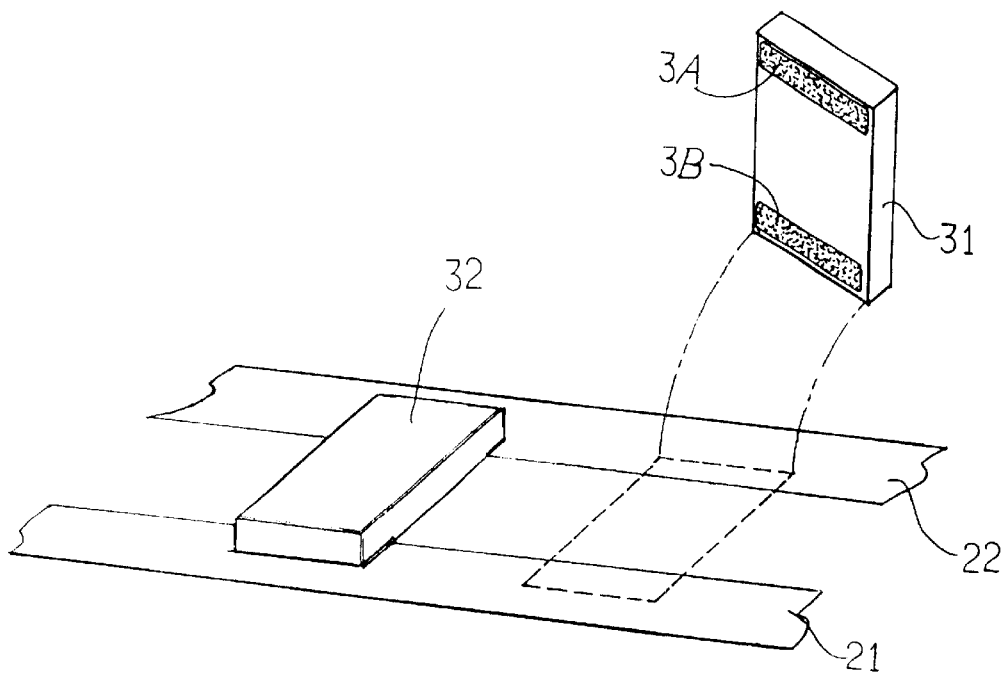
FIG. 3 is the perspective view of the PTC ceramic resistor.

FIG. 3 shows the connection of PTC resistor and the anode plate 21/cathode plate 22. The resistor 31, 32 have anode 3A and cathode 3B form one surface. The resistor with anode and cathode can be attached to the anode plate 21 and the cathode plate 22 by conductive glue or solder. Therefore, the resistor 31, 32 . . . can be heated when electric power is conducted through the anode plate 21 and the cathode plate 22. The lagging device 1 can then be heated.

Figure 4:
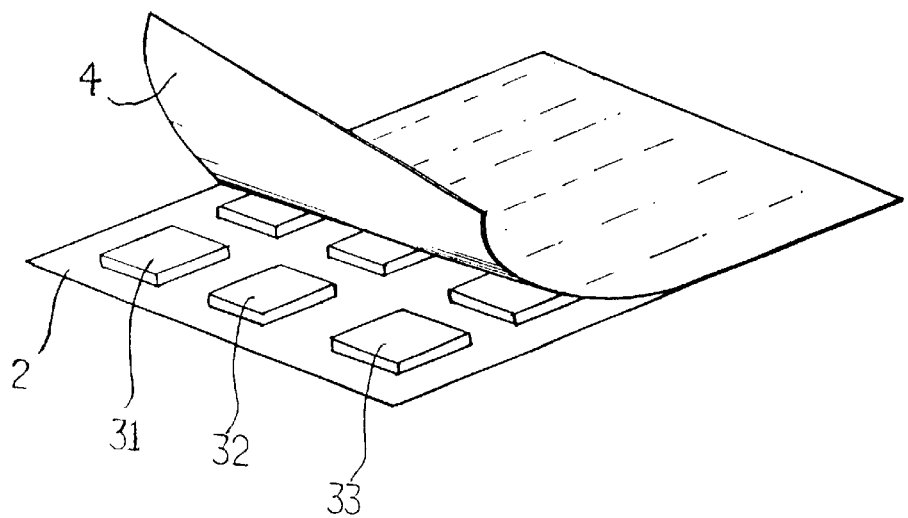
FIG. 4 is an example of the isolation layer.

As shown in FIG. 4, an isolation layer 4 is used to enclose the pad 2 and the ceramic resistor 31, 32 . . . Therefore, the portion of the anode plate 21/cathode plate 22 not covered by the resistors can be protected by the isolation layer, and the isolation layer can prevent over-heating of user. The isolation layer 4 is preferably of polymide material, or formed by spraying insulating rubber.

Figure 5:
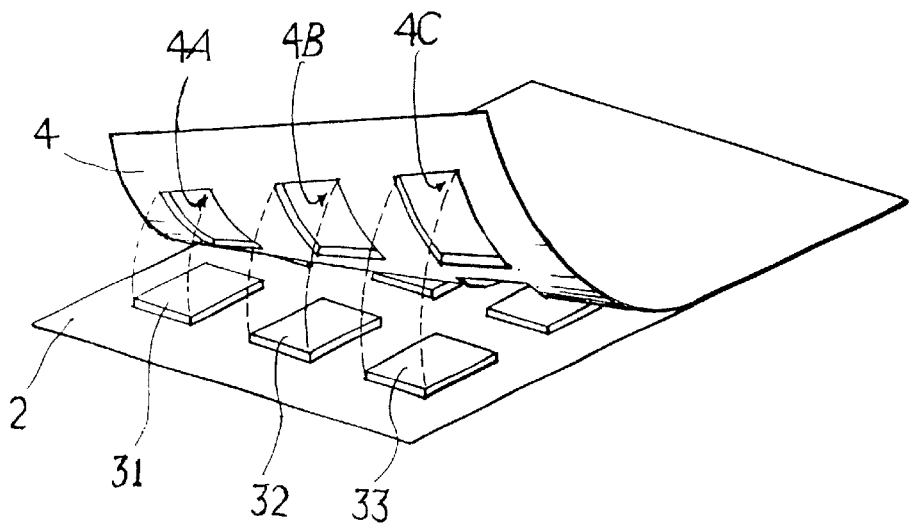
FIG. 5 is another example of the isolation layer.

As shown in FIG. 5, a plurality of grooves 4A, 4B, 4C . . . are formed on the inner surface of the isolation layer 4 with size matched with that of the resistor 31, 32 . . . Therefore, the isolation layer 4 has a tight cover over the resistor and anode plate 21/cathode plate 22 when being covered on the pad 2.

Figure 6:
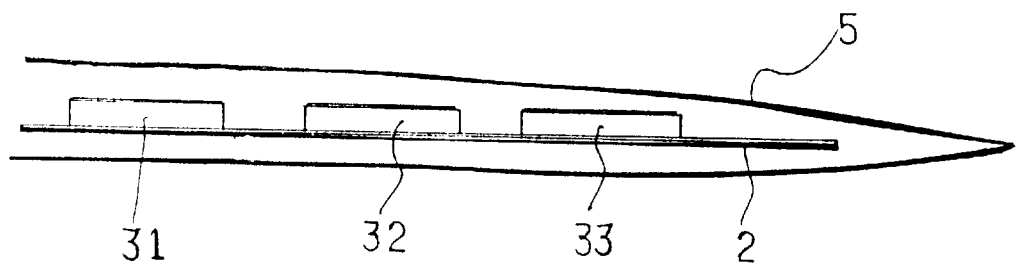
FIG. 6 is a view explaining another embodiment of the invention.

As shown in FIG. 6, an isolation bag 6 is used to enclose the lagging device 1. The isolation bag 6 can be made of refractory and insulating material such as polymide to allow user to directly contact the lagging device 1 to the portion to be kept warm. Moreover, the isolation bag 6 can be made of cotton cloth to provide ductility.

Figure 7:
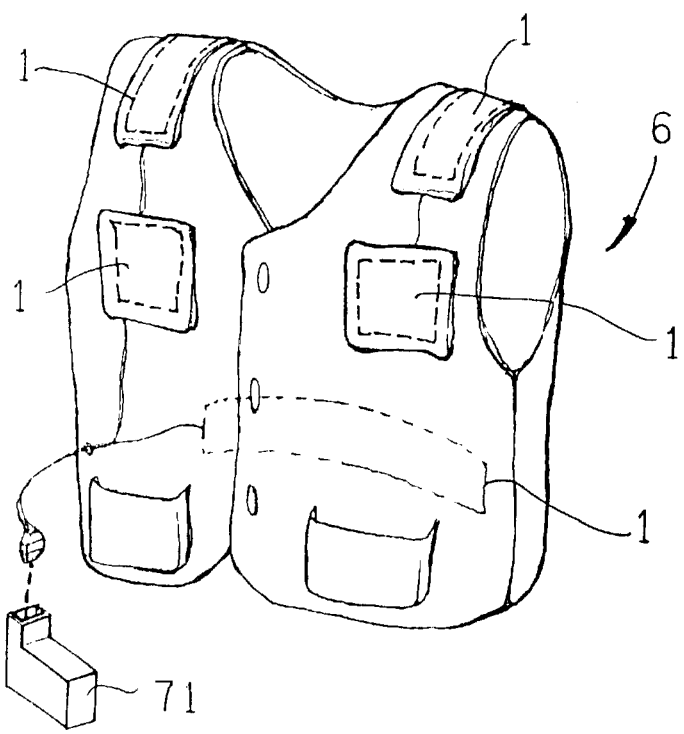
FIG. 7 is a view showing still another embodiment of the invention.
Figure 8:
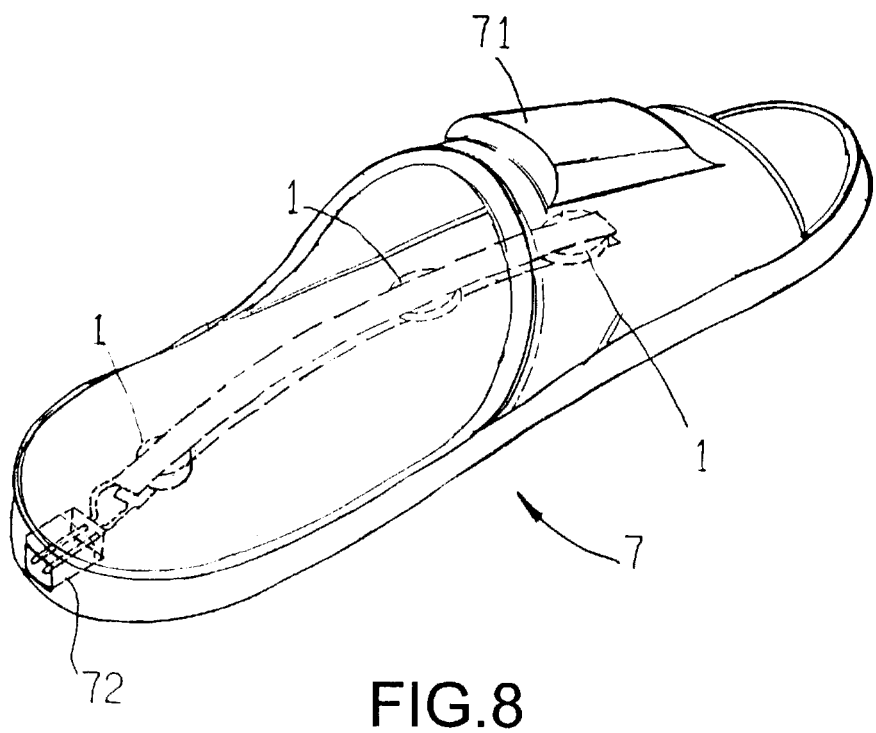
FIG. 8 is a view showing still another embodiment of the invention.

As shown in FIG. 7, the inventive lagging device 1 can be employed to the life jacket. Therefore, the drowning user can keep the body neat and prevent the risk of freeze. As shown in FIG. 8, the inventive lagging device 1 can be employed to the slipper to keep the user's foot warm. The PTC resistor 31, 32 . . . of the present invention are arranged on the sole of the slipper and are electrically connected to battery housed within the chamber arranged on the vamp (wireless application) or the power socket at the heel. The PTC resistor 31, 32 . . . of the present invention have their anode and cathode formed on the same side, and the anode plate 21/cathode plate 22 adopt flexible conductive materials. Therefore, the inventive lagging device can be applied to curve object without the problem of open circuit. The invention lagging is suitable to both household or industrial application.

Moreover the inventive lagging device can be powered by AC or DC power source, it is convenient to user.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A lagging device comprising:
   a) a flexible insulating pad having a first surface;
   b) a flexible anode and a flexible cathode located on the first surface of the flexible insulating pad, the anode having a plurality of elongated anode portions, and the cathode having a plurality of elongated cathode portions interleaved with, but spaced from the plurality of elongated anode portions;
   c) a plurality of flat PTC ceramic resistors, each having an anode and a cathode on a same side thereof, and each being mounted between and in contact with an adjacent interleaved elongated portions of the flexible anode and flexible cathode; and,
   d) a flexible isolation layer on the first surface of the flexible insulating pad so as to cover all of the plurality of PTC ceramic resistors.

2. The lagging device of claim 1 wherein the flexible isolation layer comprises a layer of polymide material.

3. The lagging device of claim 1 wherein the flexible isolation layer comprises a layer of rubber material.

4. The lagging device of claim 1 wherein the flexible isolation layer comprises a plurality of grooves, each configured and located to receive one of the plurality of PTC ceramic resistors therein.

5. The lagging device of claim 1 wherein the flexible anode and flexible cathode each comprise a metal plate.

6. The lagging device of claim 1 wherein the flexible anode and flexible cathode each comprise a conductive film.

7. The lagging device of claim 1 wherein the PTC ceramic resistors are mounted to the interleaved, elongated portions of the flexible anode and flexible cathode by a conductive paste.

8. The lagging device of claim 1 wherein the PTC ceramic resistors are mounted to the interleaved, elongated portions of the flexible anode and flexible cathode by solder.

* * * * *